(12) United States Patent
Thanh et al.

(10) Patent No.: US 7,660,881 B2
(45) Date of Patent: Feb. 9, 2010

(54) TELECOMMUNICATION SYSTEM ARCHITECTURE FOR EXTENDED OPEN SERVICE ACCESS TO MULTIPLE HETEROGENEOUS NETWORKS

(75) Inventors: Do Van Thanh, Oslo (NO); Gunvald Martin Grodem, Oslo (NO)

(73) Assignee: Telenor ASA, Fornebu (NO)

( * ) Notice: Subject to any disclaimer, the term of this patent is extended or adjusted under 35 U.S.C. 154(b) by 171 days.

(21) Appl. No.: 10/482,813

(22) PCT Filed: Jul. 12, 2002

(86) PCT No.: PCT/NO02/00260

§ 371 (c)(1),
(2), (4) Date: Jul. 12, 2004

(87) PCT Pub. No.: WO03/007628

PCT Pub. Date: Jan. 23, 2003

(65) Prior Publication Data

US 2004/0242186 A1    Dec. 2, 2004

Related U.S. Application Data

(60) Provisional application No. 60/304,780, filed on Jul. 13, 2001.

(51) Int. Cl.
*G06F 15/16*   (2006.01)
*G06F 15/173*  (2006.01)
*G06F 15/177*  (2006.01)

(52) U.S. Cl. ............... 709/223; 709/219; 709/244; 379/219

(58) Field of Classification Search .......... 718/105; 709/217–228, 244; 379/219
See application file for complete search history.

(56) References Cited

U.S. PATENT DOCUMENTS

| | | | |
|---|---|---|---|
| 6,282,575 B1* | 8/2001 | Lin et al. | 709/244 |
| 6,615,276 B1* | 9/2003 | Mastrianni et al. | 709/250 |
| 6,718,380 B1* | 4/2004 | Mohaban et al. | 709/223 |
| 2002/0013827 A1* | 1/2002 | Edstrom et al. | 709/219 |
| 2002/0085696 A1* | 7/2002 | Martin et al. | 379/201.03 |
| 2002/0127995 A1* | 9/2002 | Faccin et al. | 455/406 |
| 2002/0154755 A1* | 10/2002 | Gourraud | 379/219 |
| 2003/0017841 A1* | 1/2003 | Bos et al. | 455/550 |
| 2003/0058884 A1* | 3/2003 | Kallner et al. | 370/465 |

OTHER PUBLICATIONS

Parlay APIs 2.1, Jun. 26, 2000, pp. 1-4, of the www.parlay.org.*
ITU Telecommunication Standardization Sector, Study Group 11, pp. 1-19, May 14-25, 2001.*

* cited by examiner

*Primary Examiner*—Haresh N Patel
(74) *Attorney, Agent, or Firm*—Birch, Stewart, Kolasch & Birch, LLP

(57) ABSTRACT

A telecommunication system providing extended open service access to multiple heterogeneous networks has one unique common framework for the networks and a common service capability feature (SCF) for the networks to provide a common network interface.

9 Claims, 14 Drawing Sheets

Usage of Terminal Administrator SCF in alternative 1

Figure 1: Extensions of OSA for heterogeneous networks

Figure 2: Common framework but each network has its own SCFs

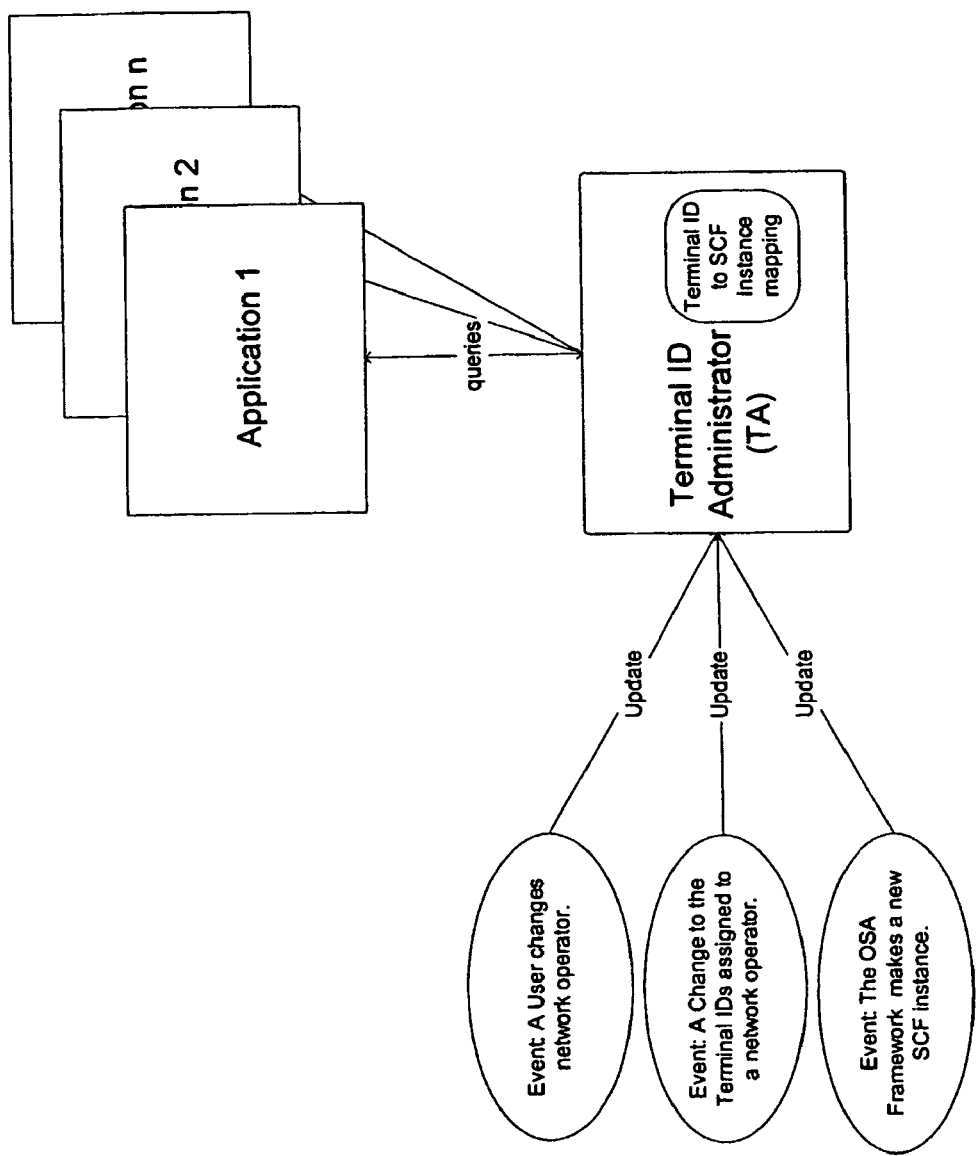
Figure 4: The Terminal ID Administrator

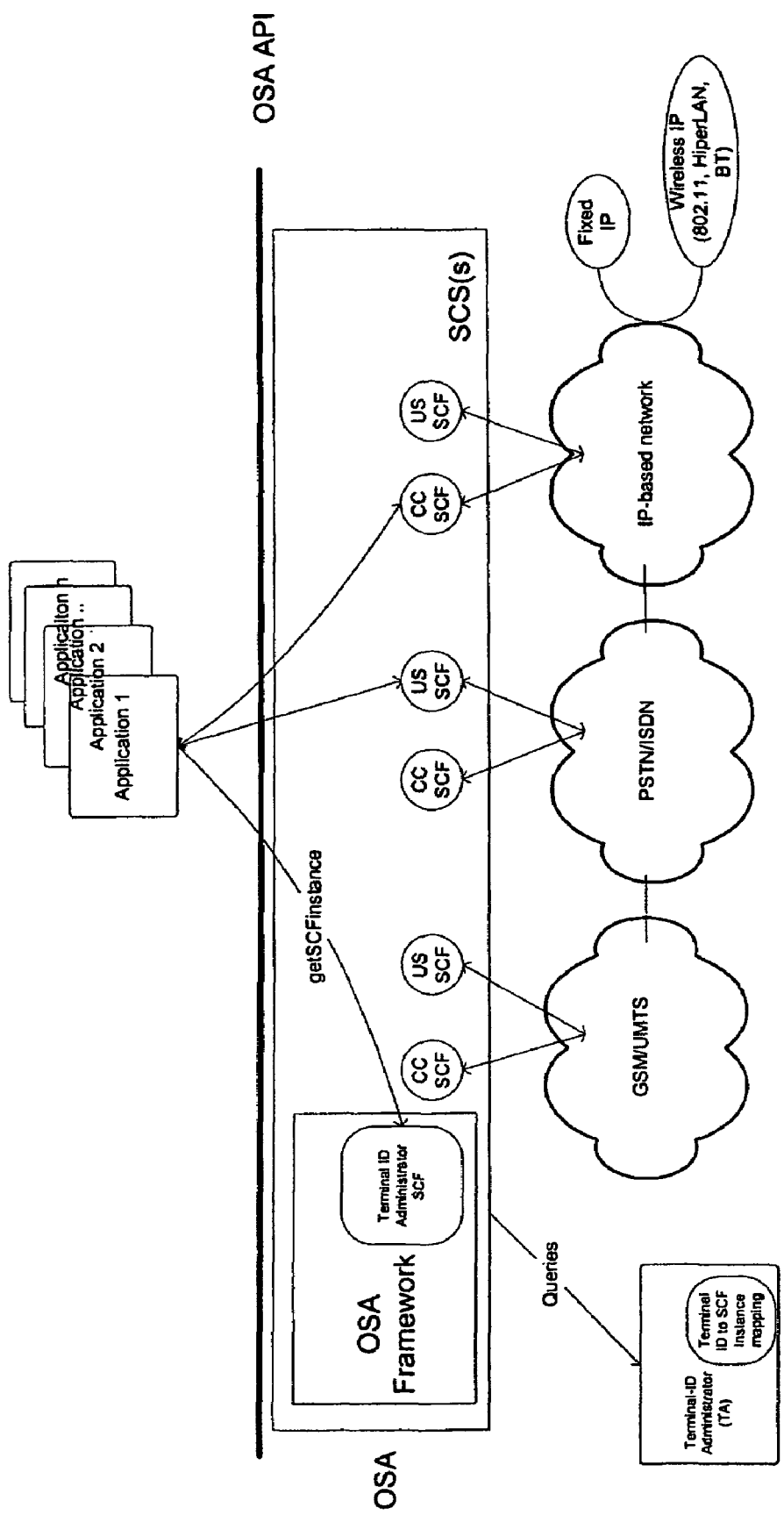
Figure 5: Usage of Terminal Administrator SCF in alternative 1

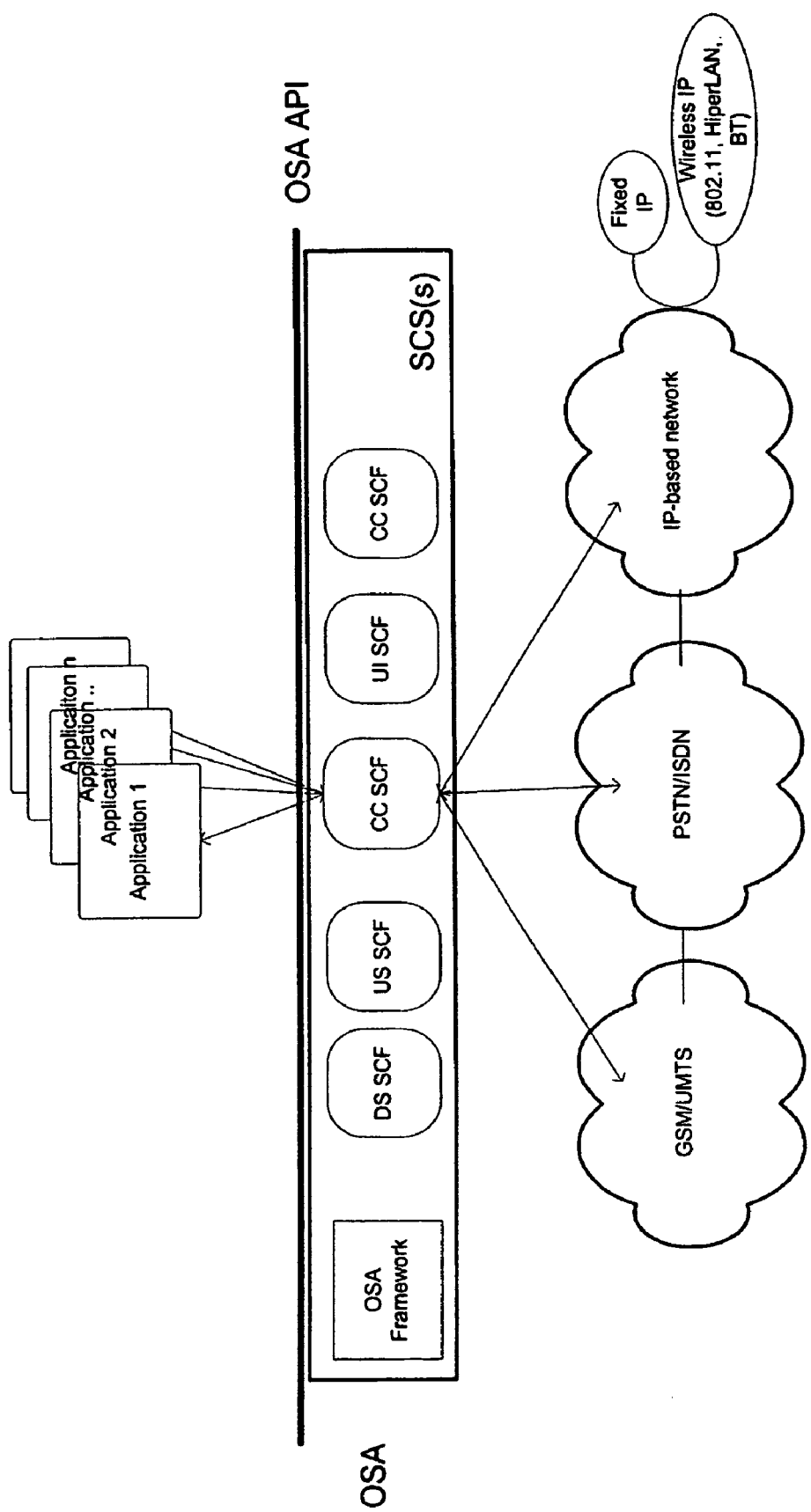
Figure 6: A common framework and a common SCF incorporating all underlying networks

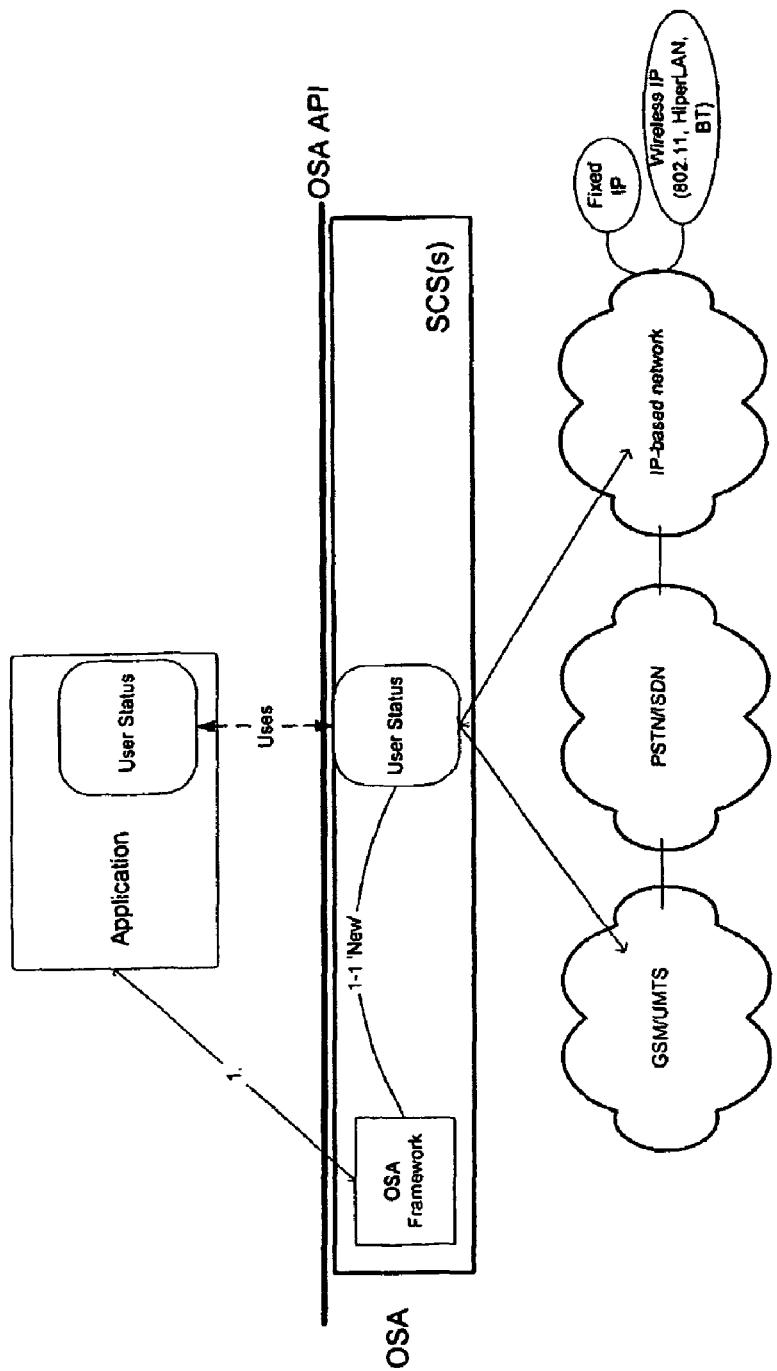
Figure 7: Usage of an SCF according to alternative 2

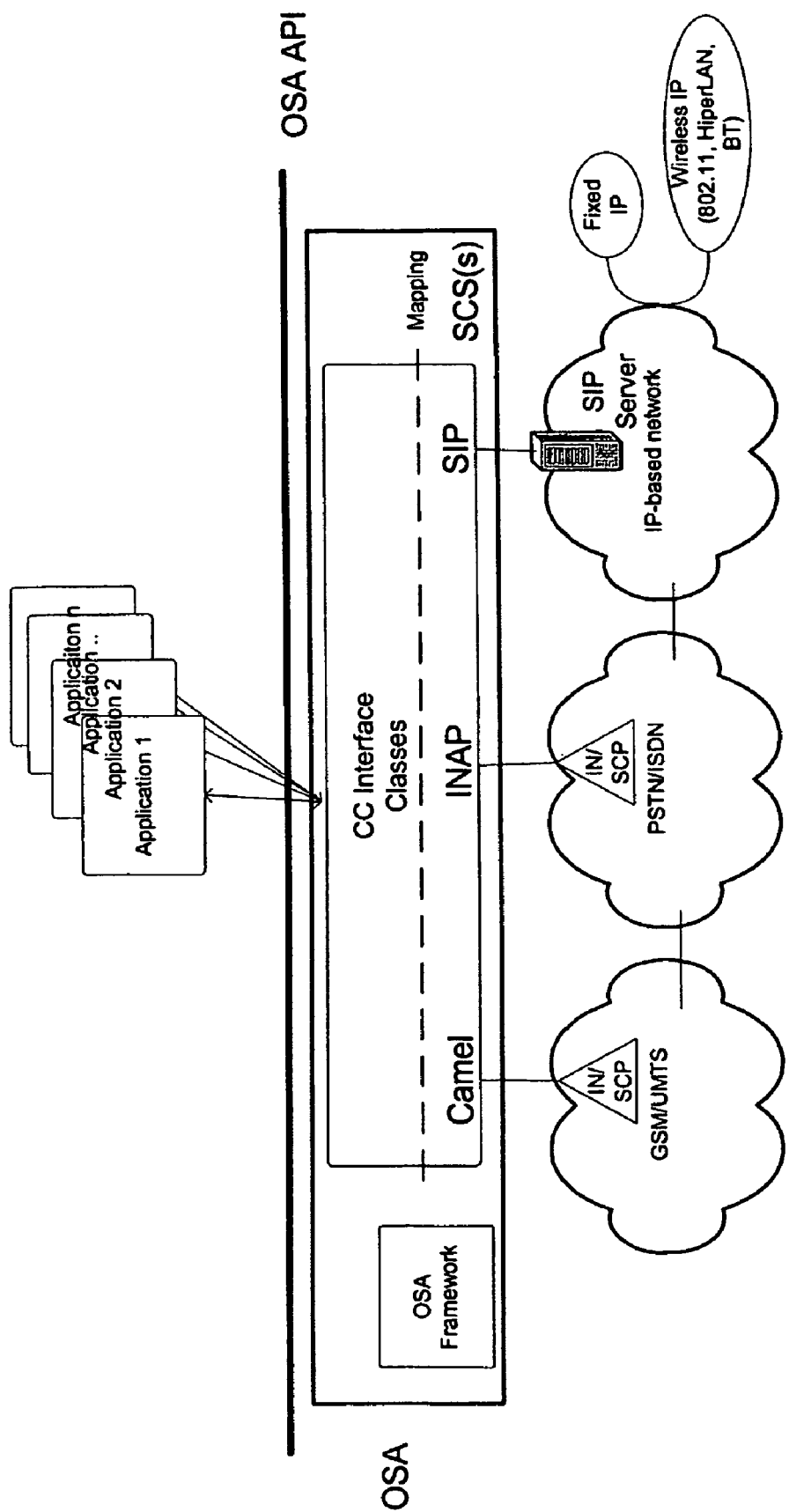
Figure 8: Implementation of alternative 2

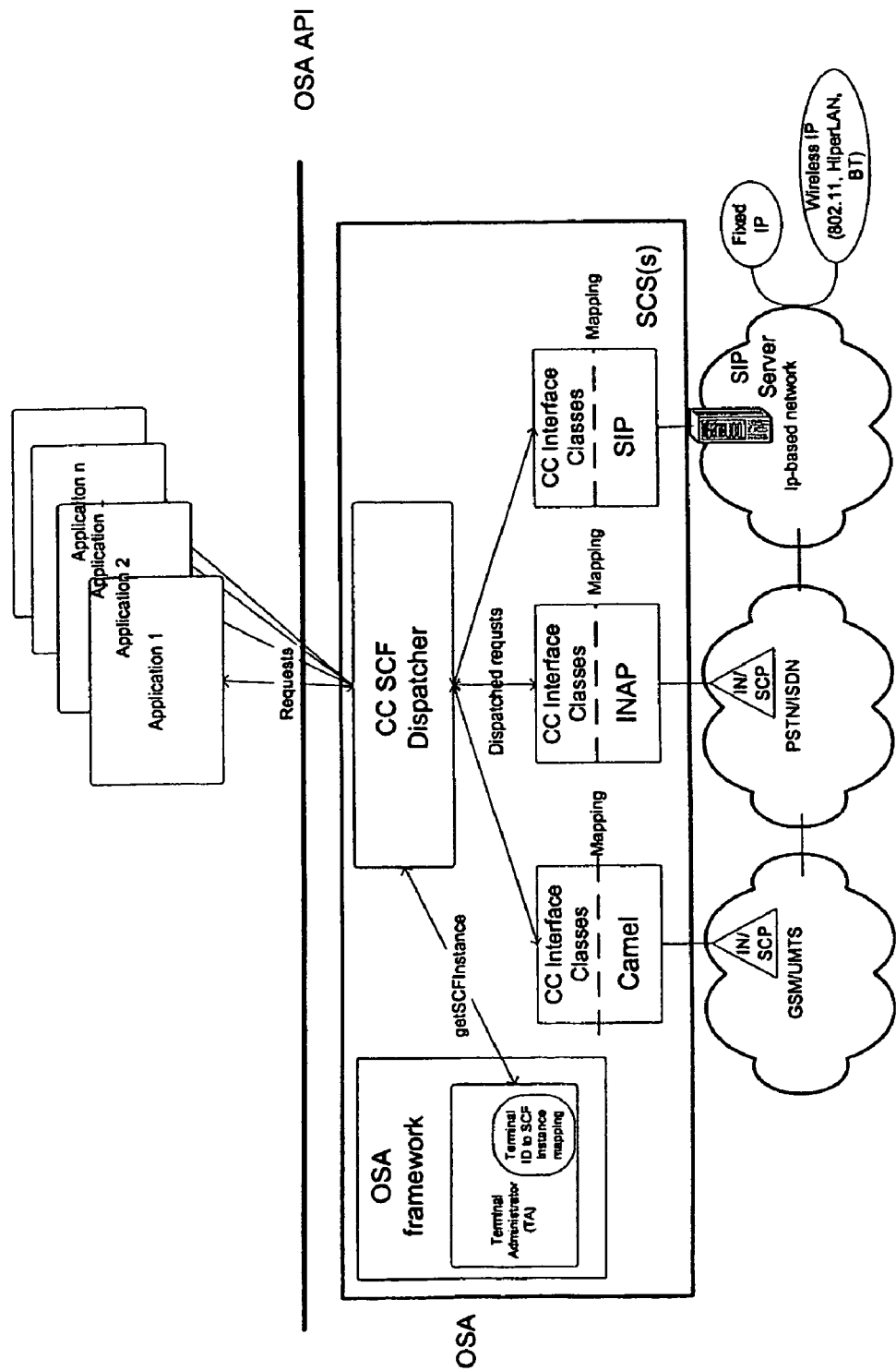
Figure 9: Introducing the dispatcher function in OSA

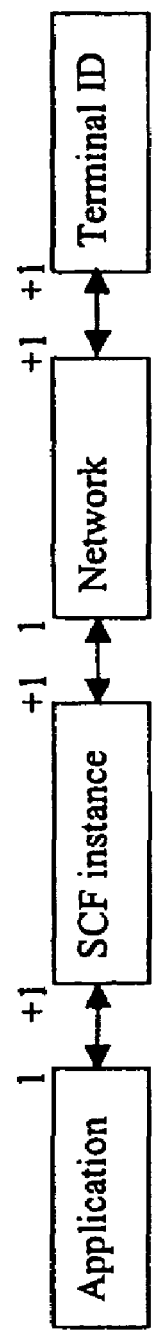
Figure 10: Relationships maintained by the TA

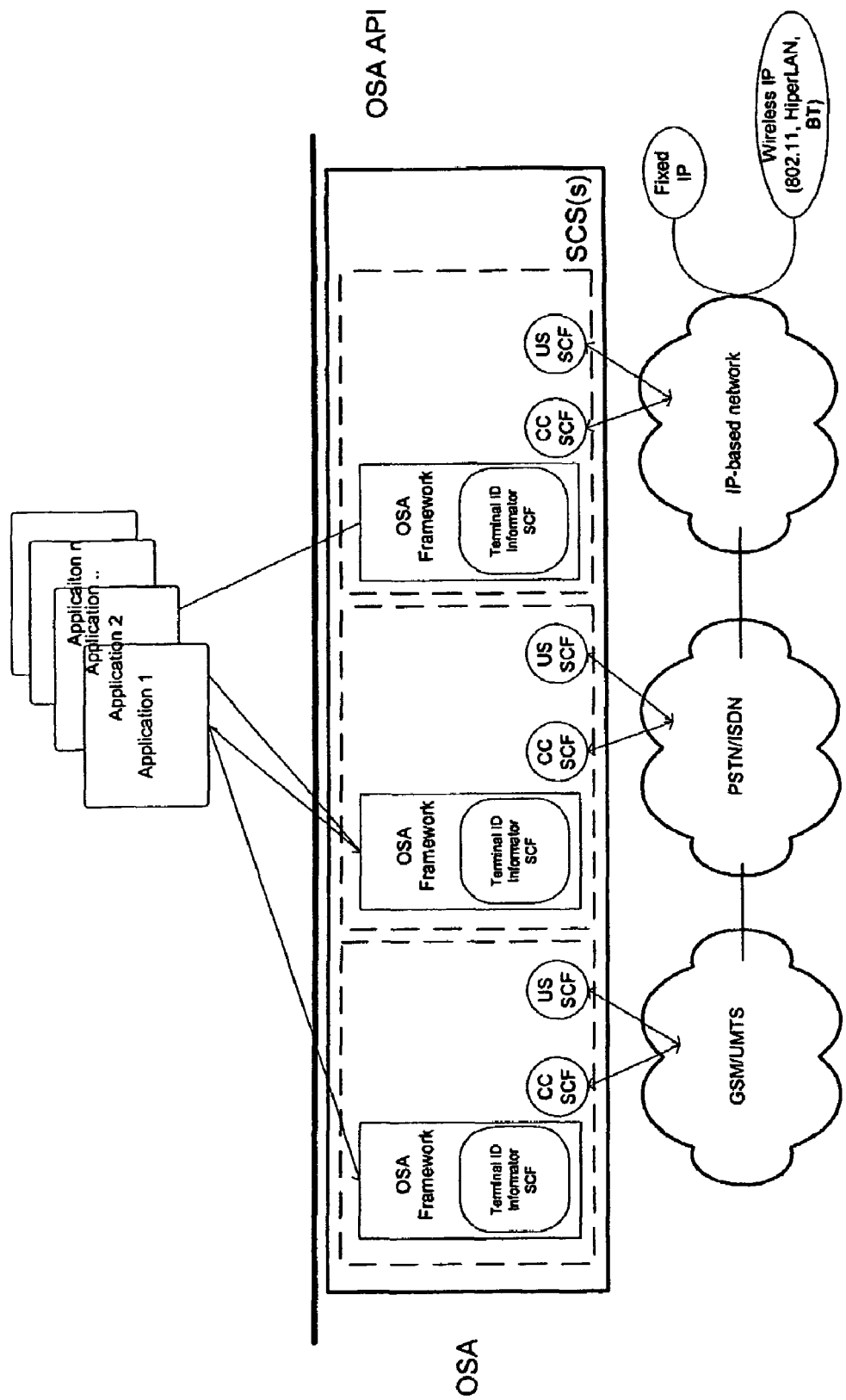
Figure 11: One framework for each underlying network

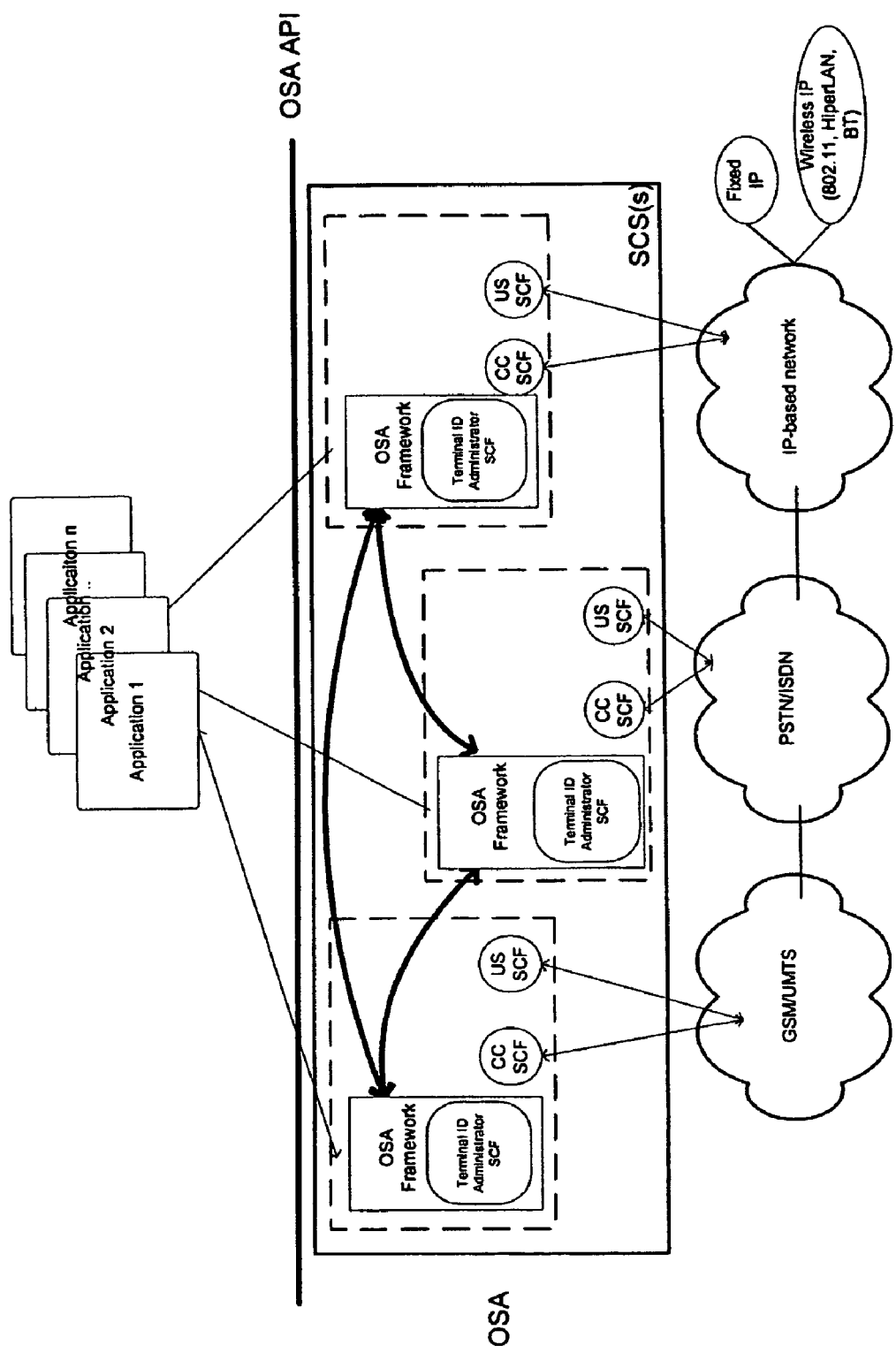
Figure 12: Communication and collaboration between frameworks

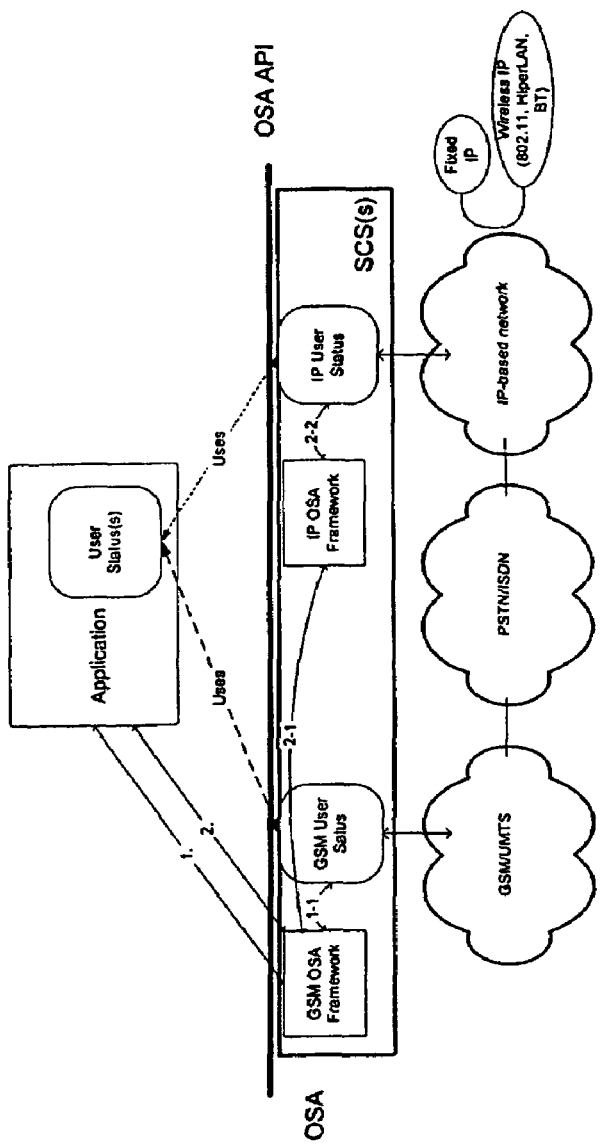
Figure 13: Usage of US SCF in both the GSM network and the IP-Based network

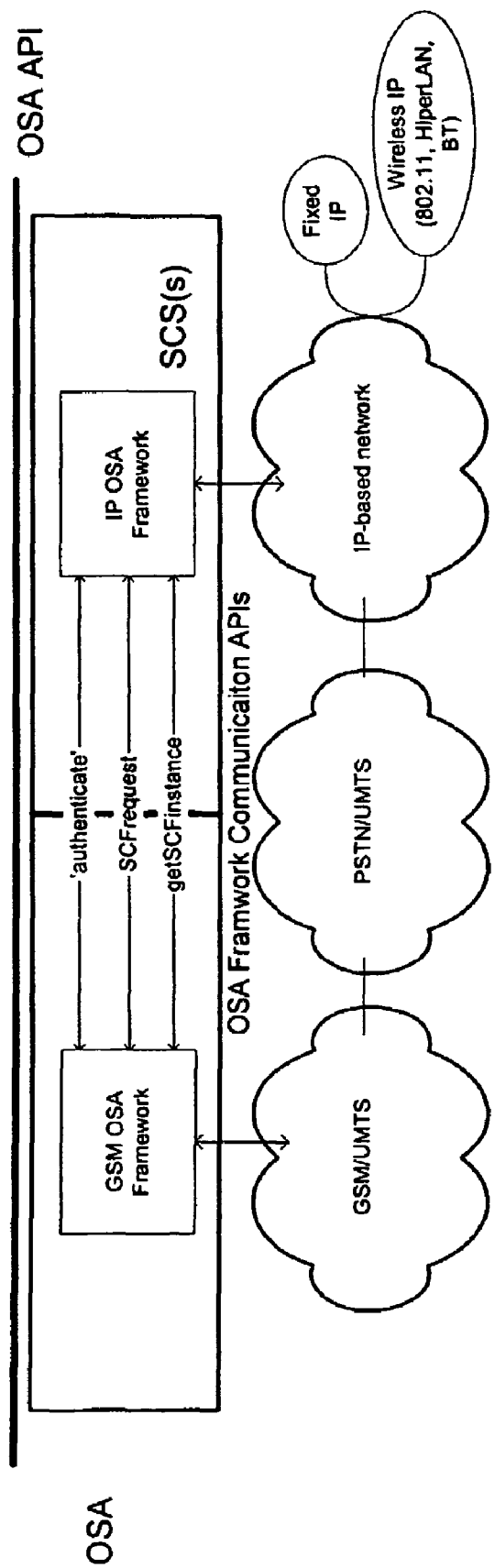
Figure 14: Communication between frameworks via OSA framework communication interfaces

TELECOMMUNICATION SYSTEM ARCHITECTURE FOR EXTENDED OPEN SERVICE ACCESS TO MULTIPLE HETEROGENEOUS NETWORKS

CROSS-REFERENCES TO RELATED APPLICATIONS

This application is a 371 of PCT/NO02/00260, filed Jul. 12, 2002, which claims priority of provisional application 60/304,780, filed Jul. 31, 2001.

FIELD OF THE INVENTION

The present invention concerns a method and a system of providing application service access on multiple heterogeneous networks. Although originating from mobile communications, the present invention can be applied to the whole telecommunication field. Furthermore, with convergence between telecommunication and computing, this invention can also be applied in data communication on packet-based networks such as IP (Internet Protocol) based networks.

BACKGROUND

In order to promote the development of third party applications the 3GPP (Third Generation Partnership Project), which is the stand-ardisation body for third generation mobile system (UMTS), introduced the Open Service Access (OSA) for third generation Mobile System (UMTS). OSA standards are defined in 3GPP, Virtual Home Environment; Open Service Architecture (Release 4). Valbonne, 2001. (3GPP TS 23.127, V4.1.0, 2001-04).

The OSA allows the applications to access the network service capabilities such as Call Control (CC), User Status (US), Messaging (M), Location Information (LI), etc. through open interfaces. Such architecture will certainly play a key role in the realisation of one or more "killer" applications, which is necessary for the success of UMTS. It is worth to stress that nobody knows yet what is going to be such a "killer" application. Indeed, for GSM nobody could predict that SMS (Short Message Service) has become the "killer" application.

OSA is only intended for mobile networks. However, with convergence between telecom and computing, between fixed and mobile, it is crucial that an application is able to operate properly independently of the underlying network. Consequently, it is necessary to extend the coverage of OSA to comprise also other networks than mobile ones such as PSTN/ISDN and also IP-based networks. It is worth noting that IP-based networks may be both wireline and wireless such as for example Wireless LAN (802.11). HiperLAN, or Bluetooth. The situation is depicted in.

Unfortunately, OSA was only intended for mobile networks and it is not specified how to implement OSA for heterogeneous networks. Furthermore, OSA, as specified by the 3GPP, is not sufficient to be applied to heterogeneous networks. The present invention proposes different embodiments to implement OSA on the top of several different networks. Also, additional functionality to OSA is required and proposed by this invention.

According to the knowledge of the inventors, no solution to the problem de-scri-bed above is known at present time. Even for the Parlay Architecture, which OSA is based on, there is no activity of implement-ing Parlay on heterogeneous networks. Although in some overview of the Parlay architecture it is shown a Parlay API covering Mobile networks, ISDN and IP-based network, there is no specification for the implementation.

SUMMARY OF THE INVENTION

In a first aspect the invention provides a telecommunication system providing application service access on multiple heterogeneous networks, comprising an open service access (OSA) extension with at least one framework providing interfaces between the applications and the multiple heterogeneous networks.

A terminal ID administrator may be incorporated providing information to the applications in selecting the required network based on terminal ID.

In a first embodiment the system comprises one unique common framework for said networks and one service capability feature (SCF) for each network providing a network specific interface. The service capability features may include a general service property indicating which underlying network a SCF is interacting with. The general service property is expressed as a string containing a <operator, network> pair.

Also in this embodiment a terminal ID administrator selects the required network service capability feature for an application based on terminal ID. The terminal ID administrator may include a database/directory containing mapping information between applications and the terminal IDs. The terminal ID administrator may also comprise a database/directory containing mapping information between applications and the service capability feature instances, between the service capability feature instances and the networks, and between the networks and terminal IDs. The terminal ID administrator is updatable in real time. An interface between the requesting application and the terminal ID administrator is provided by a terminal administrator (TA SCF) containing interface classes for application queries. The terminal administrator (TA SCF) includes program means for allowing an application to get a reference for the correct service capability feature instance for a given terminal, to query the service capability instance references for several terminal IDs simultaneously, to get a network ID of a given terminal, to get the references of all its service capability features instances, and to get the references of all its service capability features instances on a specific network.

In another embodiment the system may instead comprise one unique common framework for the networks and a common service capability feature (SCF) for the networks providing a common network interface. A general service property may be included in the service capability features indicating which underlying network a SCF is interacting with. This general service property is expressed as a set of strings, where each string contains a <operator, network> pair. The interface may include service capability interface classes providing one to many mapping between applications and the interfaces of the underlying networks.

Further, the common service capability feature may include a mapping means for mapping interface classes to the network interfaces and a dispatcher means dispatching a request from an application to a correct network interface class. A registration interface between the mapping means and the dispatcher means may enable registration of the networks with the dispatcher. The dispatcher means includes selecting means selecting the correct service capability feature (SCF) for a request arriving from an application. A terminal ID administrator selects the required network service capability feature (SCF) for an application based on terminal ID. Mapping information between applications and the terminal IDs may be included in a terminal ID administrator database/directory. The database/directory includes mapping information between applications and the service capability feature instances, between the service capability feature instances and the networks, and between the networks and terminal IDs. Also in this embodiment the terminal ID administrator is updatable in real time. The terminal ID administrator (TA SCF) provides an interface for the SCF dispatcher means, and the terminal ID administrator comprises program means which when run provides getting a reference for the correct service capability instance for a given terminal in order to dispatch the request to that SCF instance, including getting the terminal ID that the application is handled, getting the application ID of the requesting application, and the references of the service capability feature instance returned by the SCF instance.

In an even further embodiment the system may comprise a framework for each network, each framework having a service capability feature (SCF) for said network providing a network specific interface. Each framework may then include a mechanism enabling selection of a service capability feature in another framework and receipt of a reference to said service capability feature. The selectable service capability features for the frameworks may be predefined. Each framework may also comprise a terminal ID informator providing a service capability function to the applications regarding network selection based on terminal ID. The terminal ID informator returns a string containing a <Terminal ID, belong (True/False)> pair to the requesting application. All the frameworks may include program means executing when requested, a mutual authentication procedure. This may be the case each when other frameworks requesting information about the service capability features offered by said framework. For enabling this, the framework may comprise an extended interface. The extended interface may also include program means executing a request procedure returning an identity of the requesting framework together with a list of the predefined service capability features offered to said framework and a get procedure enabling a framework to request another network to return references of the service capability feature instances in accordance with the service properties specified by the requesting application. The terminal ID administrator selects the required network service capability feature for an application based on terminal ID. Selecting is enabled by a mapping function based on a database/directory interacting with the terminal ID administrator. The database/directory may also contain mapping information between applications and the service capability feature instances, between the service capability feature instances and the networks, and between the networks and terminal IDs. An information interface provides the terminal ID administrator with information concerning terminal ID ranges supported by each framework may also be included in the terminal ID administrator. The terminal ID administrator is updatable in real time.

The heterogeneous networks includes but is not limited to telecommunication networks wireless or wireline, e.g. mobile, UMTS, GSM, PSTN/ISDN or computer networks like a packet based network, e.g. IP (wireline), Wireless LAN, Bluetooth or Hiper LAN (wireless).

In a further aspect the present invention provides a method of providing application service access on multiple heterogeneous networks, comprising implementing an open service access (OSA) extension with at least one framework in an application programming interface (API) for the heterogeneous networks providing interfaces between the applications and the multiple heterogeneous networks.

In an even further aspect the present invention provides a program of an application programming interface (API) for providing open service access for applications to multiple heterogeneous networks, the program comprising a set of instructions for carrying out the method and implementing the system above.

In another aspect the present invention provides a computer readable medium having stored thereon an application programming interface (API) for providing open service access for applications to multiple heterogeneous networks, the computer readable medium comprising a set of instructions for carrying out the method and implementing the system above.

This invention will benefit different actors in telecommunications and interacting areas, like e.g. network operators, service/application providers and users in different ways. The network operators may be able provide more flexible services to the applications. They obtain therefore larger number of applications and consequently higher traffic and also larger number of users. The service/application providers can develop applications more easily and also more interesting applications. They do not have to be concerned with different networks. The applications are more generic since they can run on heterogeneous networks. Quite a lot of re-use and saving can be achieved since the same application can be deployed at different networks. The user will enjoy a broader range of applications, which are enabled by the OSA API on heterogeneous networks. Although this invention addresses the OSA it could be applied for the PARLAY architecture since OSA relies quite a lot on PARLAY.

As mentioned above the present invention solves a problem for service/application providers since it is simpler to develop applications for heterogeneous networks. At the same time it provides an opportunity to network operators who have heterogeneous networks (e.g. fixed and mobile, telecom and IP-based). The invention is defined in the appended claims.

BRIEF DESCRIPTION OF DRAWINGS

Embodiments of the invention will now be described with reference to the following drawings, in which:

FIG. 4 shows some of the properties of the Terminal ID Administrator in the first embodiment of the invention, FIG. 5 illustrates usage of Terminal Administrator SCF in the first embodiment of the invention, FIG. 6 is a view of an implementation of the present invention using a common framework and a common SCF incorporating all underlying networks, FIG. 7 shows usage of an SCF according to a further embodiment of the invention, FIG. 8 shows an example implementation of a second embodiment of the invention, FIG. 9 is a view of a dispatcher function in OSA according to a second embodiment of the invention, FIG. 10 illustrated the relationships maintained by the Terminal ID Administrator according to a second embodiment of the invention, FIG. 11 shows a third embodiment of the invention using one framework for each underlying network, FIG. 12 illustrates communication and collaboration between frameworks according to a fourth embodiment of the invention, FIG. 13 illustrates usage of US SCF in both the GSM network and the IP-Based network according to the embodiment shown in FIG. 12, and FIG. 14 shows communication between frameworks via OSA framework communication interfaces according to a fourth embodiment of the invention.

DETAILED DESCRIPTION OF INVENTION

This invention consists of two main items:
The proposal of applying OSA on heterogeneous networks.
Embodiments for implementing OSA on heterogeneous networks. For each embodiment, the required additional functions and their incorporation onto OSA are described.

This invention provides extended coverage of OSA (Open Service Access), which is originally intended to third generation mobile networks, to heterogeneous networks, i.e. comprising also PSTN, ISDN and IP-based network (Internet, Intranet). In the following, four embodiments to implement OSA on heterogeneous networks will be described. The problems related to each embodiment will be examined and required additional functions and features presented.

Embodiment 1

Figure 1:
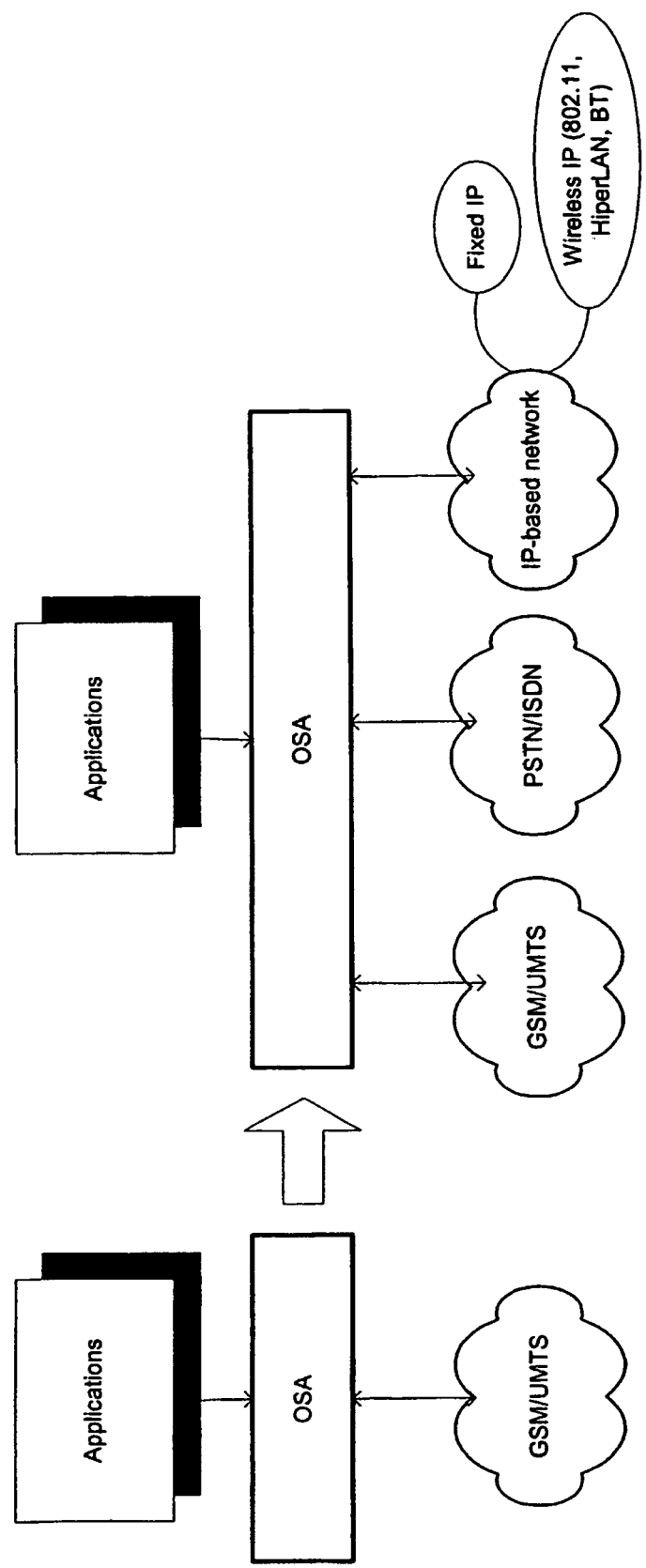
FIG. 1 depicts on the left a present architecture where applications access a mobile network via the OSA, and on the right an extended OSA for heterogeneous networks according to an embodiment of the present invention.
Figure 2:
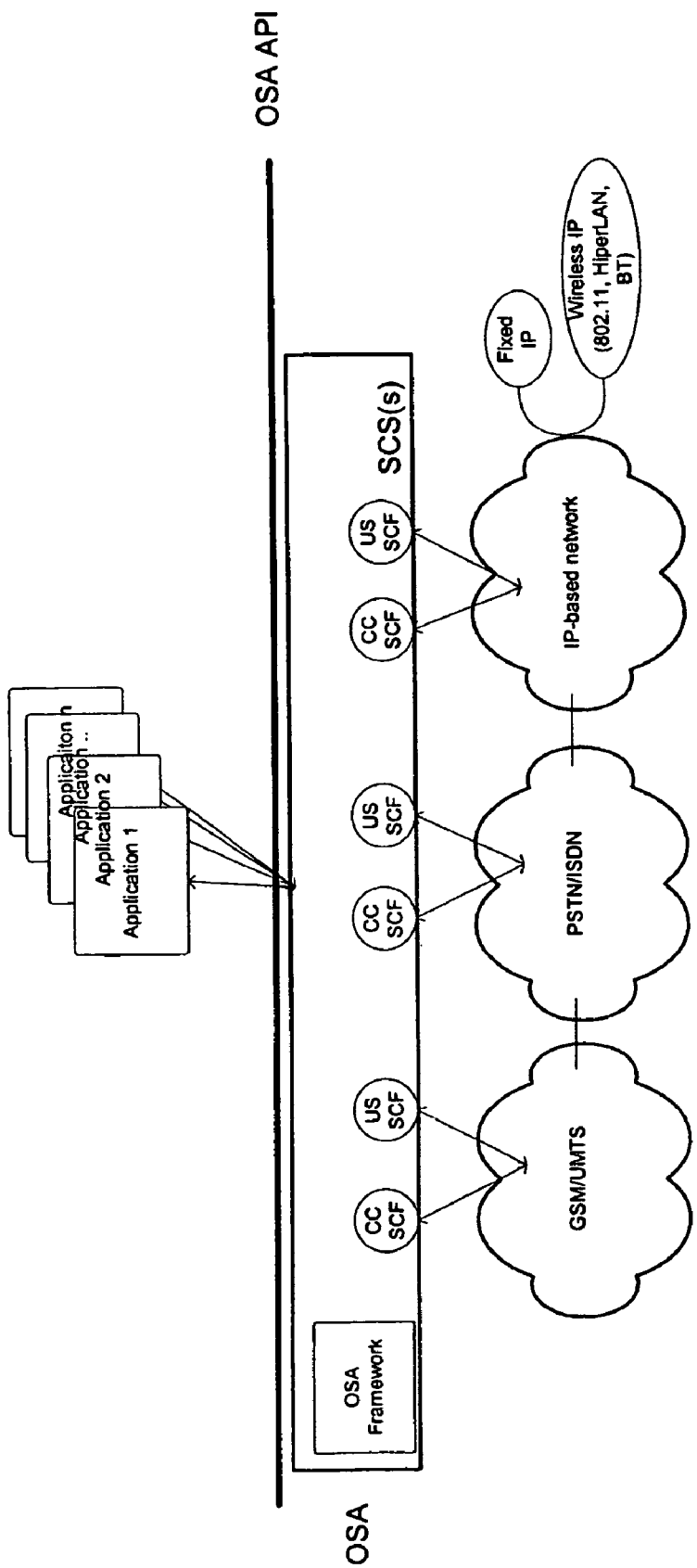
FIG. 2 shows an extended OSA for heterogeneous networks according to a first embodiment of the invention, using a common framework but where each network has its own SCFs.

A Common OSA Framework for All Networks and One Service Capability Feature for Each Network In this embodiment, a single OSA framework is incorporating all networks, but each network has their own Service Capability Features (SCFs). The GSM/UMTS network will have its SCFs such as Call Control (CC) SCF, User Interaction (UI) SCF, User Status (US) SCF etc. The same applies to the PSTN/ISDN network and the IP-Based network as shown in FIG. 2.

Hence, each SCF is mapped into the interfaces specific for each network. How the mapping is done depends on the network. For example, the CC SCF responsible for the GSM network is mapped onto the interfaces issuing Call Control in the GSM network. The same applies to the CC SCF in the PSTN/ISDN network and the IP-Based network. This leaves us with a standardised CC API to Call Control network service capabilities for each of the networks in our heterogeneous network environment, allowing third party applications to use Call Control capabilities in all networks. The same applies to other SCFs.

Required Additional Functionality

A. SCF Naming Scheme

An SCF for each underlying network needs to be identified and registered with the OSA Framework. Hence, the values of the Service Properties of the SCF needs to indicate which network each SCF belongs to. It is also necessary to recognise the owner of the network, i.e. the network operator. For this purpose a General Service Property called "Underlying Network" is introduced, which indicates which underlying network a SCF is interacting with. The property value is a string containing a pair <Operator, network>. For example for a User Status SCF the value could be: <Telenor, GSM> or <Netcom, GSM> or <Telenor, IP-based (SIP)>.

B. Selection of SCF Instance Based on Terminal ID

A major problem for the applications is how to select the correct SCF instance based only on the terminal identificators, the terminal IDs. The terminal IDs could be a regular phone number, a name or an IP address. For example, the application needs to subscribe to the right CC SCF if it wants to establish call for certain terminals. Some Terminal IDs are not in the scope of the GSM network e.g. SIP addresses, and call requests for these terminals should therefore not be addressed to the GSM network, but to the IP-based network.

Another issue is when the application wants to establish a call for example a "click to call" application, it has to select which underlying network to establish the call, i.e. which CC SCF instance to use.

Further, problems occur when an application uses e.g. the User Status SCF. The User Status (US) SCF allows applications to obtain the status (Reachable, Unreachable and Busy) of the user's terminals. The US SCF for the GSM network is only capable of delivering user status for terminals in the scope of GSM network (GSM phones registered in the HLR), the US SCF for the IP-based network is only capable of delivering user status for the users registered in the SIP server, etc. An application wanting to check the user status of a user has to select the right SCF instance, i.e. the right underlying network, according to the user's Terminal ID. For example, if the Terminal ID is a GSM number, the application has to select the US SCF instance for the GSM network. The application can then obtain the requested User Status by contacting the selected US SCF instance.

From the examples above, we observe that the applications have problems to select the correct SCF instance when performing action on SCFs. They need to have information on terminal naming/numbering, i.e. which terminals belong to which networks. Furthermore, there should be a link between the terminal IDs and the correct SCF instance. Such information is not static but is subject to frequent changes and needs to be updated frequently since people do change terminals, operators and subscriptions frequently. There is a need for an additional function, say Terminal ID Administrator, which assists the application in the selection of SCF based on terminal IDs.

Figure 3:
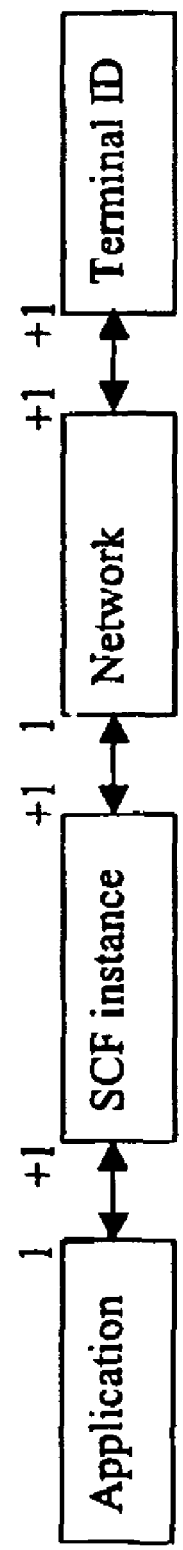
FIG. 3 shows relationships maintained by the TA in the first embodiment of the invention.

The Terminal ID Administrator (TA) incorporates a database/directory service containing the mapping between applications and SCF instances, the mapping between SCF instances and networks and finally the mapping between networks and terminal IDs, as shown in FIG. 3. The numbers in the figure indicate the cardinality. 1 mean one and exactly one while +1 means one or more. One application can have one or more SCF instance. One SCF instance has one and only one application. One SCF has one and only one network while one network may have one or more SCF. One network has one or more terminals, but one terminal belongs to one and only one network. The TA allows network operators to register changes when they occur, and allows applications to query information about all the mappings mentioned above, e.g. the SCF instance for a set of Terminal IDs as illustrated in FIG. 4.

The TA provides useful functionality for any applications that uses OSA. The TA should therefore be easily accessible for applications. For this purpose an OSA Service Capability Feature (SCF), say Terminal Administrator SCF (TA SCF), is implemented which abstracts encapsulates the functionality of the TA as a standard API. The TA SCF contains interface classes for application queries. The TA SCF interface for application queries contains the following methods which can be used by the applications:

getSCFinstance(<terminalID>,
<applicationID><SCFreference>),

<terminalID> is the terminal ID e.g. phone number that the application is handled <applicationID> is the ID of the requesting application <SCFreference> is the reference of the SCF instance returned by the TA SCF This method allows an application to get the reference of the correct SCF instance for a given terminal, e.g. e phone number.

getListofSCFinstances(<listofTerminalID>, <applicationID>, <listof SCFreferences>)

<listofTerminalID> is the list of terminal IDs to find SCF instance for

<applicationID> is the ID of the requesting application

<listof SCFreferences> is the list of references and corresponding Terminal IDs returned by the TA SCF This method allows an application to query the SCF instance references for several terminal IDs simultaneously.

getNetworkID(<terminalID>,
<applicationID><NetworkID>),

<terminalID> is the terminal ID that the application is handled

<applicationID> is the ID of the requesting application

<NetworkID> is the ID of the network, which the terminal belongs to, returned by the TA SCF.

This method allows an application to get the network ID of a given terminal.

getAllSCFinstance,
(<applicationID><ListofSCFreference>),

<applicationID> is the ID of the requesting application

<SCFreference> is the list of the SCF instance references for an application returned by the TA SCF This method allows an application to get the references of all its SCF instances.

getAllSCFinstance, (<applicationID>, <networkID>, <ListofSCFreferencse>),

<applicationID> is the ID of the requesting application

<networkID> is the ID of the network, e.g. <Telenor, GSM>, <OperatorX, ISDN>, <OperatorY, IP-based>, etc.

<SCFreference> is the list of the SCF instance references for an application returned by the TA SCF This method allows an application to get the references of all its SCF instances on a specific network.

Example

Let us suppose that an application wants to obtain the user status for a terminal ID, e.g. phone number 12345678. The application sends a query to the TA SCF (getSCFinstance), including the terminal ID>=12345678 and the name of the SCF, <SCFtype>="User Status". In response, the application receives the object reference to the User Status SCF that the requested terminal ID belongs to. Now, the application can use the correct US SCF without being concerned with underlying networks. Hence, when using the TA SCF, this embodiment is confirmed with the goals of OSA.

Embodiment 1 as explained above is summarized in FIG. 5.

Embodiment 2

A Common Framework and a Common SCF (Service Capability Feature) for All Networks In this embodiment of the invention a single OSA framework is incorporating all networks and an SCF is representing all underlying networks. For example the Call Control SCF will incorporate call control capabilities for the GSM/UMTS network, the PSTN/ISDN network and the IP-based network. The same applies to the other SCFs as shown in FIG. 6.

Hence, each SCF communicates with all networks. For example, the CC SCF is mapped into the interfaces issuing Call Control in the GSM network, the PSTN/ISDN network and the IP-Based network. The applications are able to perform call control on all networks using only a single CC SCF. The same applies for other SCFs.

Additional Functionality

A. SCF Naming Scheme

An SCF is now representing several underlying networks and it is necessary to specify every one of them. It is also necessary to recognise the owner of each network, i.e. the network operator of each network.

In this embodiment of the invention it is introduced a General Service Property called "Underlying Network", which indicates which underlying networks a SCF is interacting with. The property value is a set of strings where each string contains a pair: <Operator, network>. For example for a User Status SCF the value could be: {<Telenor, GSM>, <Netcom, GSM>, <Telenor, IP-based (SIP)>}. This is illustrated in the example in FIG. 7. In FIG. 7 the application selects (trades) the User Status SCF in the GSM network and the IP based network, using the desired Service Properties in the OSA Framework. This is indicated by 1 in FIG. 7. The OSA Framework then agrees to the service trading, makes a new instance of a User Status SCF, which can interact both with the GSM/UMTS network and the IP-based network, and then returns a reference to the User Status instance, to the application, as shown by 1.1 'New' in FIG. 7.

B. Dispatching Function

Each SCF is in this embodiment now responsible for all underlying networks, thus the Interface Classes of a SCF need to be mapped to all the interfaces for every network (One to many mapping). For example, the Call Control Interface Classes have to implement the mapping between the OSA Call Control API to the SS7 INAP for the PSTN/ISDN network, the mapping between the OSA Call Control API and the SIP protocol for the IP-Based network and the mapping between OSA Call Control API and to CAMEL for the GSM/UMTS network. This is shown in FIG. 8.

Since the network equipment in each underlying network can be developed by different vendors (e.g. IN systems for GSM are developed by Ericsson, Alcatel; SIP servers developed by HotSip, Dynamicsoft, Ubiquity, etc.) some problems will occur. Each vendor is only able to implement the mapping of the OSA interface classes to the interfaces to their network equipment. In addition, the solution is not flexible since it is required that one vendor is developing the mappings from OSA Interface Classes to all the network specific interfaces in all heterogeneous networks.

In this embodiment of the present invention some necessary modifications to OSA are made. An SCF is split into two separate components:

- One component implementing the mappings from OSA Interface classes to the interfaces of the underlying networks.
- Another component responsible for dispatching a request from an application to the correct SCF connected to the correct underlying network.

By splitting the SCF into two components, network equipment vendors need only develop the mapping of the OSA Interface Classes to the interfaces on their network equipment (One to one mapping) while applications need to deal with only one SCF instance even though the SCF interacts with many heterogeneous networks. The component implementing the interface mappings is practically identical to the SCFs specified in OSA.

The component responsible for dispatching request from applications, the "SCF dispatcher", is an additional function to OSA. The interface to the applications must of course be the same as specified for each SCF in the OSA specification.

In addition, there is a "Registration interface" between the two SCF components, enabling the SCFs for each network to register with the "SCF dispatcher". The network specific SCF provides the "SCF dispatcher" a reference to itself and the Service Properties that it supports. Hence, the "SCF dispatcher" holds the knowledge of the capabilities for the network specific SCF and is then able to register itself with the OSA framework, supplying the Service Properties that it supports, i.e. the sum of all the Service Properties provided by each network specific SCF instance.

For each application, an instance of the SCF Dispatcher will be created. Depending upon which underlying networks the application is allowed to use service capabilities on, respective instances of SCF for each network will be created. The SCF Dispatcher instance stores the references of all these SCF instances. The "SCF dispatcher" also incorporates functionality to select the right SCF instance when a request arrives from an application. To illustrate the necessity of such a function, let us suppose that an application requests the status of a user to the US SCF. The Application has a Service Level Agreement indication that allows it to use the US SCF for the GSM network, the PSTN/ISDN network and the IP-Based network (SIP). The US SCF ("US SCF dispatcher") is able to interact with all three underlying networks. Hence, it must be able to determine which underlying network the request relates to, in order to dispatch the request to the correct US SCF instance. This is actually the same requirement as described in the previous embodiment 1, namely selecting the correct SCF instance based on the Terminal ID.

Therefore, the "SCF dispatcher" should use the Terminal ID Administrator (TA) to inquire the SCF instance from the Terminal ID. The "SCF dispatcher" is then able to dispatch the request from the application to the correct SCF instance, using the result from the query to the Terminal-ID Administrator. Note, that all responses and reports from the network SCFs go through the "SCF dispatcher" before being sent to the respective application. This is illustrated in FIG. 9.

C. Selection of SCF Instance Based on the Terminal ID

There is a need for a Terminal ID administrator as also shown in FIG. 9. The Terminal ID Administrator (TA) incorporates a database/directory service containing the mapping between applications and SCF instances, the mapping between SCF instances and networks and finally the mapping between networks and terminal IDs. The relationships maintained by the Terminal ID Administrator are shown in FIG. 10. The numbers in the figure indicate the cardinality. 1 means one and exactly one, while +1 means one or more.

The Terminal ID Administrator enables network operators to register changes when they occur. The Terminal ID Administrator also offers an interface to the SCF dispatchers which contains the following method:

getSCFinstance(<terminalID>, <applicationID><SCFreference>), where

<terminalID> is the terminal ID that the application is handled

<applicationID> is the ID of the requesting application and

<SCFreference> is the reference of the SCF instance returned by the SCF instance This method allows the SCF dispatchers to get the reference of the correct SCF instance for a given terminal in order to dispatch the request to that SCF instance.

The Terminal ID administrator in this second embodiment is not visible and available to the applications in the same way as in the first embodiment, but exists only inside the framework, e.g. for the SCF dispatcher.

Example

Let us suppose that an application wants to obtain the user status for a terminal ID, e.g. phone number 12345678. The application sends a query to the CC SCF Dispatcher, including the <terminal ID>=12345678 and the name of the SCF, <SCFtype>="User Status". The CC SCF Dispatcher sends a request (getSCF instance) to the Terminal ID Administrator via the Terminal ID to SCF instance mapping. In response, the CC SCF Dispatcher receives the object reference to the User Status SCF that the requested terminal ID belongs to. Now, the Dispatcher can use the correct US SCF without being concerned with underlying networks.

Embodiment 3

A Framework for Each Network

In this embodiment, one OSA framework incorporates only one underlying network. For example, the OSA framework in the GSM network has only the responsibility for the service capabilities in the GSM network, thus it controls all the SCFs (CC SCF, US SCF shown in FIG. 11) in the GSM network. The same applies to the PSTN/ISDN network and the IP-based network as shown in FIG. 11.

Each SCF is mapped to the interfaces specific for each network. For example, the CC SCF in the GSM network is mapped onto the interfaces issuing Call Control in the GSM network. The same applies to the CC SCF in the PSTN/ISDN network and the IP-Based network. This allows applications to make use of service capabilities in all underlying networks, by addressing to each OSA framework separately.

Additional Functionality

A. Selection of Framework Based on the Terminal IDs

The applications must know which framework to address given a terminal ID. In this embodiment each framework has an SCF "Terminal ID Informator". The Terminal ID Informator SCF has an interface allowing applications to ask whether a terminal belongs to an underlying network supported by the framework. The ask procedure can be expressed as follows:

TerminalInfoReq <Terminal ID, belong (True/False)>

The terminal ID together with a true or false is returned from the SCF interface through the OSA Framework to the asking application. If the terminal does not belong to the framework, the procedure returns a False and the application proceeds by asking other frameworks until it receives a True as answer. The application can then select and use the desired SCF. The true/false is represented by a Boolean.

Example

An application wants to obtain the user status for a terminal ID, e.g. phone number 12345678. The application sends a query to an OSA Framework, including the <terminal ID>=12345678 and the name of the SCF, <SCFtype>="User Status". The OSA Framework forwards the request to the Terminal ID Informator SCF. If the terminal ID exists in that framework, the Informator SCF interface returns a True to the OSA Framework. The application will then select and use the desired SCF. If a false is returned, the application will send the request to another OSA Framework.

Embodiment 4

Communication and Collaboration Between the Different OSA Frameworks

In this embodiment one OSA framework incorporates only a single underlying network, like in the third embodiment. However, in addition, communication and collaboration are enabled between frameworks. Interoperability between frameworks is established and applications may need to deal with only one OSA framework, in order to make use of service capabilities from many heterogeneous networks (See FIG. 12).

In addition to the SCFs of the "home" framework, the applications can also use the SCFs belonging to other frameworks on other networks by simply issuing requests towards their "home" framework. The framework will then communicate with the actual framework to ask for the reference of the SCF instance. If no such instance was created for the application, the "foreign" framework will create one and return the reference to the "home" framework. The "home" will then return the reference to the requesting application. For a Service Capability Feature, the application may have references of several SCF instances, which represents different networks such as GSM, PSTN or IP. The service properties of each SCF instance are therefore differentiated. The Terminal ID Administrator will, when given a terminal ID, return the reference of the SCF to be used. This is illustrated in FIG. 13 showing usage of US SCF in both the GSM network and the IP based network.

Let us suppose that an application selects a User Status SCF in the GSM network and a User Status SCF in the IP-Based network, using the framework in the GSM network. (1. and 2. in FIG. 13.) The US in the GSM network is traded in the usual way as defined by OSA. The framework in the GSM network should then ask the framework in the IP-based network to create a new US SCF instance, using the Service Properties supplied by the application and return a reference to the US instance to the application. (The reference is a pointer to the created SCF instance. The actual embodiment is dependent on the implementation.) Hence, the OSA interface in this embodiment comprises mechanisms to enable a framework to select an SCF in another framework and to be able to receive a reference to the SCF instance. In FIG. 13 this is 2-1.

where the OSA Framework in the GSM network selects (trades) the US SCF in the IP-based network, using a method in the OSA Framework Communication API in the OSA Framework in the IP-based network. Then the framework returns the reference to the SCF instance to the application using an ordinary trading function specified by the OSA standard. In 2-2. in FIG. 13 the OSA Framework IP-based network agrees to the service trading, makes a new instance of a US SCF for the IP-based network and returns a reference to the SCF to the OSA framework in the GSM network, which then returns the reference to the SCF application.

Additional Functionality

A. Communication Between Frameworks

The OSA frameworks for the different underlying networks know about each other and collaborate in order to serve the applications. What SCFs that are offered between the different frameworks are predefined. In addition the following functions are included in the OSA frameworks:

Authentication Between Frameworks

In order to prevent fraudulent use and attacks it is preferred to have a strong mutual authentication procedure between the frameworks before allowing any further operations between them. The authentication procedure may be anyone known in the art.

Service Trading Between Frameworks

In this embodiment of the invention every framework is extended with an interface allowing other frameworks to request information about the SCFs offered by the framework. The interface therefore includes the following SCFrequest method:

SCFrequest(<requestingFrameworkID>, <ListOfSCFoffered>), where

<requestingFrameworkID> is the identity of the requesting framework and

<ListOfSCFoffered> is the list of the offered SCFs, which are offered to the requesting framework. This list may be different depending on the requesting framework.

When receiving the list of offered SCFs, the requesting OSA framework saves the list with offered SCF's in the same way as "local" registered SCFs. In this way it is able to show it to the requesting applications. It also saves the information about which OSA framework owns what SCFs.

Service Usage Between Frameworks

Every framework is extended with an interface allowing other frameworks to use its SCFs. The interface includes the following methods:

getSCFinstance(<serviceID>, <serviceProperties>, <reference>, <frameworkID>, <applicationID>), where <serviceId> is the ID of the requesting SCF, <serviceProperties> is the list of properties specified by the application belonging to the requesting framework, <reference> is the reference of SCF instance, <frameworkID> is the ID of the requesting framework, <applicationID> is the ID of the requesting application, With this method an OSA framework can request another framework to return the reference of the SCF instance according to the service properties asked by its application. If no such instance exists, the framework will create one. The OSA framework must save the received reference with its respective OSA framework. An OSA framework should have a list of SCF instance references and their respective framework. Communication between the OSA frameworks, using the interfaces specified above, is shown in FIG. 14.

B. Terminal ID Administrator

Given a terminal ID the application needs to know which SCF instance to use since terminals can belong to different networks and hence be handled by different SCF instances. Again the applications need assistance from the framework. In this embodiment each framework is equipped with a Terminal ID Administrator (TA), which is implemented as an SCF. The TA SCF is similar to the one described in embodiment 1. In addition, the TA SCF is supplied with the terminal ID ranges supported by each OSA framework. (A terminal ID may e.g. be a telephone number or an IP address or a name.) These can be supplied by several ways such as off-line installation, by enabling interaction between TAs or by having a common information database.

Example

An application wants to obtain the user status for a terminal ID, e.g. phone number 12345678. The application sends a query to an OSA Framework, including the <terminal ID>=12345678 and the name of the SCF, <SCFtype>="User Status". The OSA Framework forwards the request to the Terminal ID Administrator SCF. If the terminal ID exists in that framework, the application will then select and use the desired SCF. If the requested terminal ID is outside the ranges supported by the OSA, the OSA Framework will request another framework according to the framework list of SCF instance references and their respective framework.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A telecommunication system providing extended open service access to multiple heterogeneous networks, hereafter called underlying networks, the system comprising:
   one unique common framework for the underlying networks; and
   a common service capability feature for the underlying networks providing a common network interface, wherein the common service capability feature comprising:
   a mapping means for mapping open service access interface classes to interfaces of the underlying networks; and
   a dispatcher means dispatching a request from an application to a corresponding network interface class so that the telecommunication system can simultaneously provide extended open service access to each underlying network;
   a terminal ID administrator for selecting a network service capability feature instance for an application based on terminal ID, said service capability feature instance being selected from a set of multiple service capability feature instances
   wherein the terminal ID administrator provides an interface for the dispatcher means, the terminal ID administrator comprising program means for providing via the interface a reference for the service capability feature instance in response to receiving via the interface said terminal ID and an application ID for said application, the dispatcher comprising program means for using the reference to dispatch said request to the service capability feature instance.

2. A telecommunication system providing extended open service access to multiple heterogeneous networks, hereafter called underlying networks, the system comprising:
   one unique common framework for the underlying networks; and
   a common service capability feature for the underlying networks providing a common network interface, wherein the common service capability feature comprising:
   a mapping means for mapping open service access interface classes to interfaces of the underlying networks; and
   a dispatcher means dispatching a request from an application to a corresponding network interface class so that the telecommunication system can simultaneously provide extended open service access to each underlying network;
   a terminal ID administrator for selecting a network service capability feature instance for an application based on terminal ID, said service capability feature instance being selected from a set of multiple service capability feature instances;
   wherein the terminal ID administrator comprises a database/directory containing mapping information between applications and terminal IDs.

3. The telecommunication system according to claim 2, wherein the common service capability features comprising a general service property indicating which underlying network a network SCF service capability feature is interacting with.

4. The telecommunication system according to claim 3, wherein the service property is a set of strings, each string containing a <operator, network> pair.

5. The telecommunication system according to claim 2, wherein the common network interface comprising service capability interface classes providing a one to many mapping between applications and interfaces of the underlying networks.

6. The telecommunication system according to claim 2, comprising a registration interface between the mapping means and the dispatcher means, said registration interface enabling registration of the underlying networks with the dispatcher means.

7. The telecommunication system according to claim 2, wherein the dispatcher means comprising selecting means selecting a service capability feature instance in response to said request from an application.

8. The telecommunication system according to claim 2, wherein the terminal ID administrator is updated in real time.

9. A telecommunication system providing extended open service access to multiple heterogeneous networks, hereafter called underlying networks, the system comprising:
   one unique common framework for the underlying networks; and
   a common service capability feature for the underlying networks providing a common network interface, wherein the common service capability feature comprising:
   a mapping means for mapping open service access interface classes to interfaces of the underlying networks; and
   a dispatcher means dispatching a request from an application to a corresponding network interface class so that the telecommunication system can simultaneously provide extended open service access to each underlying network;

a terminal ID administrator for selecting a network service capability feature instance for an application based on terminal ID, said service capability feature instance being selected from a set of multiple service capability feature wherein the terminal ID administrator comprises a database/directory containing mapping information between applications and the service capability feature instances, between the service capability feature instances and the underlying networks, and between the underlying networks and the terminal IDs.

* * * * *